Sept. 22, 1953 R. F. STERLING 2,653,139
IN-PLACE EXPANDED CELLULAR RESINOUS BODIES AND PROCESSES
FOR PRODUCING THEM FROM PHENOL-ALDEHYDE
RESINS WITH THE AID OF A PEROXIDE
Filed May 20, 1950
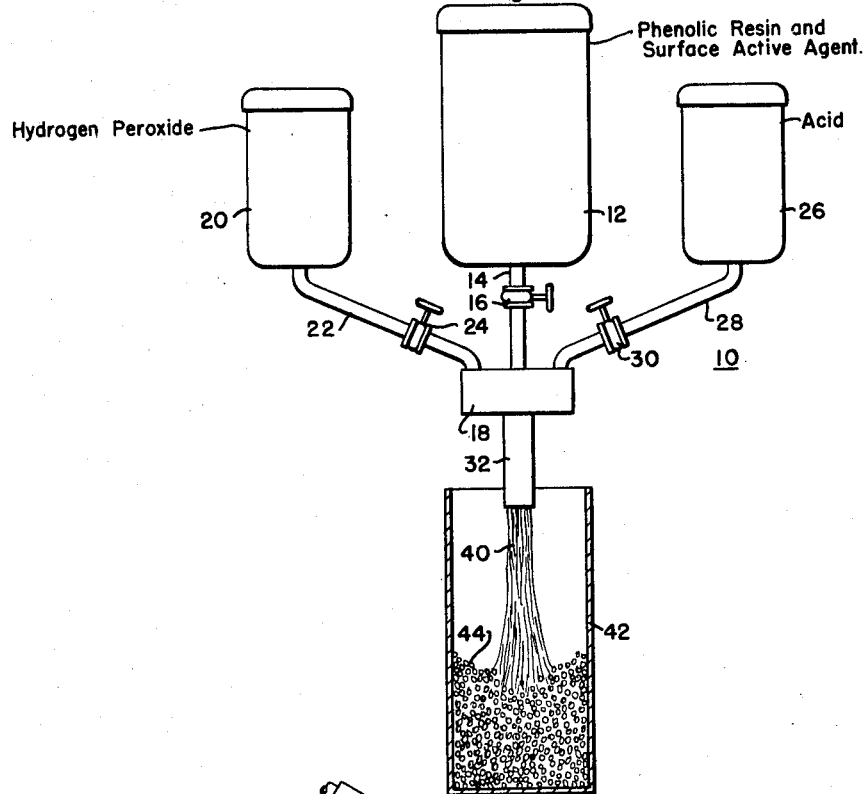
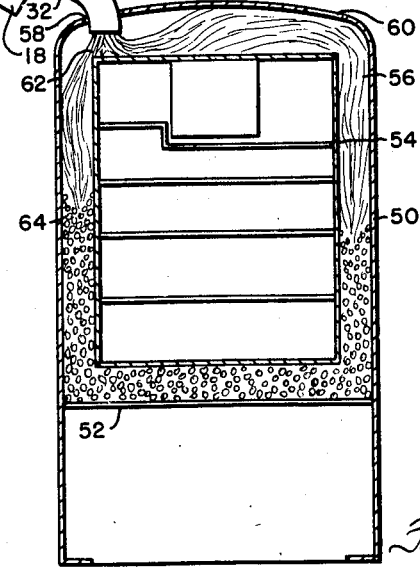
WITNESSES:
H. F. Susser
Wm. L. Groome
INVENTOR
Robert F. Sterling.
BY
Frederick Shepor
ATTORNEY

UNITED STATES PATENT OFFICE 2,653,139

IN-PLACE EXPANDED CELLULAR RESINOUS BODIES AND PROCESSES FOR PRODUCING THEM FROM PHENOL-ALDEHYDE RESINS WITH THE AID OF A PEROXIDE

Robert F. Sterling, Pittsburgh, Pa., assignor to Westinghouse Electric Corporation, East Pittsburgh, Pa., a corporation of Pennsylvania Application May 20, 1950, Serial No. 163,108

6 Claims. (Cl. 260—2.5)

This invention relates to compositions that will react spontaneously to produce cellular expanded thermoset resinous bodies, and to the process for producing such cellular expanded bodies and to the resulting product.

In my copending application Serial No. 136,101, filed December 30, 1949, there is disclosed compositions that when heated will expand into cellular resinous bodies of low density. However, for numerous applications it is not practical, or costly and inconvenient, to heat such compositions to produce the expanded cellular resinous bodies. Thus, in the insulation of homes and various building structures, it is extremely difficult to apply heat to produce an expansion of the compositions in order to provide such homes and buildings with thermal insulation in the walls thereof. In any event, it is obvious that a separate heating step adds to the cost of the cellular thermoset insulation.

The object of the present invention is to provide a composition that comprises an admixture of components that will expand or foam spontaneously within a short period of time after admixture and will thermoset without the addition of external heat.

A further object of the invention is to provide a process for combining certain ingredients in predetermined proportions into a composition that may be introduced into any desired space and which will spontaneously react into an expanded cellular mass which thermosets without the use of external heating.

A still further object of the invention is to provide articles of manufacture embodying a thermoset expanded resinous body.

Other objects of the invention will in part be obvious and will in part appear hereinafter. For a better understanding of the nature and objects of the invention, reference should be had to the following detailed description and drawing, in which:

Figure 1 is a vertical elevation, partly in section, of an apparatus carrying out the process of the present invention; and Fig. 2 is a fragmentary vertical cross section through a refrigerator cabinet illustrating the application of the spontaneously expanding cellular compositions of the present invention.

In accordance with the present invention, certain ingredients are admixed in predetermined proportions to produce a composition that after a brief period of time spontaneously reacts to produce an expanded cellular body and thermosets in such expanded condition to a low density resinous body. No external heat need be employed to cause the expansion and thermosetting to take place. The composition may be introduced or applied to a wide variety of members requiring thermal or sound insulation which the expanded thermoset resinous body will provide. Furthermore, the proportions of the ingredients may be varied in order to control the density of the ultimate thermoset expanded resinous body to meet predetermined requirements.

Briefly, the invention comprises essentially a composition prepared by admixing (a) between 50 and 90 parts by weight of a thermosetting partially reacted aqueous reaction product of a phenol and an aldehyde, (b) between 5 and 0.1 parts by weight of certain non-ionic and cationic surface active agents, (c) solutions of certain peroxides in an amount to provide free oxygen equal to that available in from 1 to 20 parts by weight of 100% $H_2O_2$ and (d) from 49 to 2 parts by weight of certain strong acids, the total being 100 parts by weight. The ingredients (a), (b), (c) and (d) are preferably admixed in the order listed. However, the (a) reaction product and (b) the surface active agent may be admixed at any time since they form a stable admixture. In some instances, the (c) peroxide and (d) the acid may be admixed before introducing them into the mixture of (a) the reaction product and (b) surface active agent. When admixed, the composition possesses a brief induction period that may last only a few seconds for certain proportions of the composition to as much as 60 minutes for other proportions though most of the compositions will begin to react in from 2 to 5 minutes. The induction period can be controlled to some extent but once reaction has initiated it proceeds rapidly. Heat may be applied if desired to initiate the reaction at any predetermined time.

The phenol aldehyde resin (a) of the composition is a specific product. It is prepared by reacting one mole of at least one monohydric phenol selected from the group consisting of phenol (monohydroxy benzene), cresol, xylenol and cresylic acid, with from one to three moles of at least one aldehyde selected from the group consisting of formaldehyde, polymers of formaldehyde such as paraformaldehyde and polyoxymethylene, acetaldehyde, hexamethylenetetramine and furfuraldehyde. The reaction is carried out in the presence of substantial quantities of water. The phenol and the aldehyde are reacted with an alkaline catalyst in the proportions of from 0.05% to 5% of the weight of the phenol. Any conventional alkaline catalyst suitable for promoting the reaction of phenol and formaldehyde into a phenolic resin may be employed. Examples of such catalysts are sodium hydroxide, potassium hydroxide, barium hydroxide, calcium hydroxide, calcium oxide, sodium carbonate, sodium bicarbonate, barium carbonate, ethylene diamine, propylene diamine, ammonia, hexamethylenetetramine, and aniline. It will be appreciated that other alkali and alkaline earth metal oxides, hydroxides, carbonates, bicarbonates, and primary and secondary aliphatic and aryl amines may be employed. The reaction of the phenol and aldehyde may be carried out in the temperature range of between 50° C. and 125° C., with or without refluxing, for a period of time of from one-half hour using the maximum amount of the catalyst and the highest temperatures to as much as twenty hours or longer using the least amount of catalyst and the lowest reaction temperatures. The sufficiency of the reaction is determined by the nature of the resulting product as will be set forth.

After the reaction product has reached the desired state of reaction, it is partially dehydrated by applying a vacuum. It may be desired, though not necessary, to reduce the alkalinity of the reaction product, or even render it acidic, by treating it with acid prior to dehydration. Thus the reaction product may have a pH of as high as about 11, due to the alkaline catalyst used, to as low as 3 by the addition of an acid.

For reducing the pH organic acids, such as lactic, tartaric acid, citric acid, acetic acid, oxalic acid, malonic acid, maleic anhydride, phenol sulfonic acid, and formic acids will give good results. Mineral acids, such as hydrochloric, sulphuric and phosphoric acids, may also be introduced into the reaction product to reduce the pH.

The dehydration of the resinous reaction product, whether acidified or not, is carried out to provide a product containing between 3% and 25% by weight of water and the balance being the partially reacted phenol-aldehyde resin. With this amount of water, the resin composition should be of a viscosity of between 1 and 250 poises as measured at 25° C. Excellent low density expanded cellular bodies have been obtained when the viscosity of the resinous product was between 10 and 60 poises. The dehydration may be carried out at a vacuum of from five inches of mercury absolute pressure or lower with a temperature during vacuum dehydration varying from about 50° C. to about 100° C. The cooled product after the partial dehydration is a liquid aqueous composition that is stable for prolonged periods of time and can be employed in preparing the present expandible compositions at any time. A mixture of several different resins prepared as disclosed herein may be made use of.

The surface active agents (b) to be employed in the practice of the invention are selected from one or more of non-ionic and cationic, water soluble, acid stable, surface active compounds. Particularly satisfactory results have been secured by employing surface active agents selected from the group consisting of non-ionic alkyl and fatty acid polyethers and alcohols wherein the alkyl and fatty acid groups contain over four carbon atoms. Examples of members of this group are the octadecyl phenol ethylene oxide condensation product and the polymers of such product, dodecyl phenol ethylene oxide, and decyl phenol ethylene oxide sulfate; the manufacture of the members of this group is disclosed in detail in Patents 2,454,541, 2,454,542, 2,454,543, and 2,454,544. Alkyl aryl polyethylene glycol ethers having four to twenty carbon atom alkyl hydrocarbon groups and phenyl and substituted phenyl groups may be used. Examples are the polyethylene oxide ether of octodecyl phenol, the polyethylene oxide ether of ricinoleic acid and octyl phenol polyethylene glycol ether. Still other members of this group of non-ionic surface active agents are the sorbitan esters of acids having from 12 to 24 carbon atoms, for example, sorbitan monolaurate, sorbitan monopalmitate, sorbitan monostearate, sorbitan tristearate and sorbitan trioleate. The polyoxyalkylene sorbitan esters of organic acids containing from 12 to 24 carbon atoms have been found to be quite suitable. Examples of this latter group are polyoxyethylene sorbitan monolaurate, polyoxyethylene sorbitan tristearate, polyoxyethylene sorbitol monolaurate, polyoxypropylene-ethylene sorbitan monolaurate, and polyoxyethylene sorbitan pentaoleate. The preparation of some of these compounds is described in Patent 2,380,166. Examples of suitable quaternary ammonium compounds are cetyl dimethyl benzyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride. The suitable quaternary ammonium compounds should have at least two hydrocarbon alkyl groups attached to nitrogen. A halide such as chlorine or bromine is ordinarily attached to the nitrogen atom in these compounds. In particular, the acid stable, water soluble, non-ionic and cationic surface active agents disclosed herein have been found to be specific to the reaction and other surface active agents have been found to be unsatisfactory and not suitable in the satisfactory practice of the present invention.

The peroxide (c) preferably comprises an aqueous solution of hydrogen peroxide of a concentration of from 20% to 90% $H_2O_2$, though successful results have been had with solutions of methyl ethyl ketone peroxide of a concentration of from 40% to 80% in organic solvents such as dimethyl phthalate. We have found that aqueous solutions of hydrogen peroxide are easier to handle, give outstanding uniformity of cellular product and would be preferred in practicing the invention.

The strong acid component (d) of the composition is preferably selected from at least one of the group consisting of hydrochloric acid, sulfuric acid, nitric acid, phosphoric acid, pyrophosphoric acid, polyphosphoric acid, water soluble sulfonic acids, hydrobromic acid, hydriodic acid and trichloroacetic acid. The term water soluble sulfonic acid is intended to include organic sulfonic acids, as for example phenolsulfonic acid, chlorosulfonic acid, ethanesulfonic acid, mixed alkanesulfonic acids, metabenzene disulfonic acid, 1 - naphthol - 8 - sulfonic acid, anthraquinone-2-sulfonic acid, anthroquinone-2,7-disulfonic acid, bromobenzene-4-sulfonic acid, meta-cresol sulfonic acid, resorcinol sulfonic acid and the like. While most of the acids are available commercially in aqueous solution, the liquid anhydrous acids may be applied to the composition, though the aqueous solutions of the acid may be the only liquid form as in the case of hydrochloric acid, and the like. Either liquid aqueous solutions or liquid acids may be employed. It is preferred for the practice of the invention that the acids comprise not over 80% by weight of water, and preferably less.

The compositions embodying phosphoric acid, pyrophosphoric acid and polyphosphoric acids or a major proportion of such phosphoric acids are of extremely low flammability and for this reason are preferable for commercial applications of the composition.

Referring to Fig. 1 of the drawing, there is illustrated apparatus 10 for carrying out the process of the present invention. The apparatus 10 comprises a storage tank 12 in which is placed (a) the partially reacted phenolic resin admixed with (b) the surface agent in the required proportions. It should be understood that the surface active agent may be disposed in a separate storage container, if desired. The tank 12 is so arranged that the ingredients therein are under pneumatic, hydraulic or mechanical pressure or so located that the ingredients will tend to flow out therefrom under gravity into a conduit 14 in which is disposed a metering and control valve 16. It will be understood that the control valve 16 may be replaced by other means that may be employed to regulate the flow of the mixture from the tank 12 to a mixing device 18. The (c) aqueous solution of hydrogen peroxide is stored in a tank 20 also under pressure or arranged otherwise to cause the peroxide to flow in the conduit 22 to a control valve 24 for metering the rate of flow of hydrogen solution to the mixer 18. In the third tank 26 is disposed the strong acid similarly under pressure or otherwise so that it will flow into conduit 28, such flow being regulated by a valve 30 before the acid enters the mixer 18. The metering and control valves 16, 24 and 30 should be settable to regulate the flow of the components in the proper proportions to the mixer 18. The mixer 18 may comprise simply a common chamber in which the (a) phenolic resin, (b) surface active agent, (c) hydrogen peroxide and (d) acid are brought together and allowed to intermingle. There may be disposed in the mixer chamber suitable impellers or stirring elements to enable the more thorough admixture of all the ingredients. The several ingredients of the composition may be each brought into the mixer as a plurality of fine streams arranged to intermingle intimately. The composition in the form of an intimate mixture of the ingredients is permitted to issue from the mixer 18 into a tube 32 which enables the composition in the form of a stream, 40 to be introduced into any desired receptacle or position. As shown in Fig. 1, a container 42 of metal, wood, glass, paper, or any other suitable material is disposed to receive the composition 40 therein. Within a brief period, ordinarily only a few minutes after the composition 40 has been introduced into the receptacle 42, spontaneous reaction will take place causing it to expand into a cellular mass 44, as shown. If unrestrained, the composition will expand to a certain maximum amount depending on the proportion and type of ingredients forming the composition 40. Within a short time after expansion, the mass 44 will thermoset due to the evolution of considerable amounts of heat and by reason of the mutual reaction of the components in the composition. A thermoset cellular resinous body of low density will result.

Referring to Fig. 2 of the drawing, there is illustrated the application of the composition of the present invention to a domestic refrigerator comprising outer wall 50 and a shelf 52 surrounding a freezing or refrigerated compartment defined by the walls 54. A hollow space 56 separates the walls 54 from the exterior of the refrigerator. An aperture 58 is provided at the upper part of the outer wall 50 to enable the tube 32 of mixer 18 to be inserted therein. A second aperture 60 is provided at a remote point of the upper surface of the wall 50 to permit air within the space 56 to escape as composition 62 is introduced by the tube 32. A metered amount of the composition 62 is introduced by the tube 32 into the hollow space 56. Within a short period of time, without the application of external heat, or while the composition 62 is still being introduced into the space, the composition reacts spontaneously into a cellular foamy mass that fills the entire space 56 and thermosets in a short time thereafter. Excellent thermal insulation with a minimum of labor is thereby secured. The apertures 58 and 60 may be sealed with suitable closures after the composition 62 has been so introduced and converted into cellular insulation 64. The composition 62 in expanding will fill very fine crevices and penetrate into all of the cavities of the space 56 to fill them completely with the cellular thermoset composition 64.

The following examples illustrate the practice of the invention.

*Example I*

A phenol aldehyde resin was prepared by reacting 1 mole of phenol with 2½ moles of 40% aqueous formaldehyde with sodium hydroxide as a catalyst in the proportion of 1½% of the weight of the phenol. The reaction was carried out for three hours without refluxing at a temperature of from 77° C. to 83° C. At the end of this period, sufficient lactic acid was added to reduce the pH of the reaction mixture to a value of 6. The acidified product was dehydrated under a vacuum varying from 25½ inches of mercury to 27½ inches of mercury to a final temperature of 75° C. When cooled to room temperature, the resinous composion had a viscosity of between 46 and 65 poises. It contained approximately 15% by weight of water.

*Example II*

The partial reaction product or phenol aldehyde reaction product of Example I was employed in preparing the following composition, in which all parts are by weight:

| | |
|---|---|
| Phenol formaldehyde resin | 72½ |
| Condensation product of ethylene oxide and octadecyl phenol | 1½ |
| Hydrogen peroxide (50% concentration) | 20 |
| Phenol sulfonic acid (65% concentration) | 6 |

The phenol formaldehyde reaction product was initially admixed with the condensation product of octadecyl phenol and ethylene oxide, then the hydrogen peroxide was stirred into this mixture which was stable for approximately 60 minutes. The phenol sulfonic acid was then added and thoroughly mixed in a brief period of time and immediately poured into a receptacle. In approximately two minutes after this last admixture, the composition began to foam spontaneously into an expanded cellular body which thermoset within a short period of time. When allowed free expansion, the thermoset cellular compositions of this example has overall densities of from 0.25 to 0.4 pounds per cubic foot.

Example III

The following were admixed in the order given:

| | |
|---|---|
| Phenol formaldehyde reaction product of Example I | 70.6 |
| Octyl phenol polyethylene glycol ether | 1.4 |
| Hydrogen peroxide (50% concentration) | 16.6 |
| Polyphosphoric acid | 11.4 |

When admixed and introduced into a container and permitted to expand without restraint, as set forth in accordance with Example II, the composition of this example produced a low density thermoset resinous body having a density of less than 0.8 pounds per cubic foot.

The composition of Example III was combined by admixing the phenol formaldehyde reaction product with the polyethylene glycol ether, and the hydrogen peroxide and polyphosphoric acid were separately carefully mixed in a manner to prevent overheating and then these two intermediate mixtures were combined. The thermoset cellular body produced by following this latter procedure was of a similar low density to that of the preceding process. Furthermore, both compositions were of an extremely fine texture. One outstanding property of the cellular thermoset resins of this example was the non-inflammability thereof. For many applications, such non-inflammable characteristic is quite important and desirable.

Example IV

The following were combined as set forth in Example II:

| | |
|---|---|
| Phenol formaldehyde reaction product of Example I | 73.7 |
| Cetyl dimethyl benzyl ammonium chloride | 1.3 |
| Methyl ethyl ketone peroxide (60% solution in dimethyl phthalate) | 25 |
| Hydrochloric acid (35%) | 10 |

The mixed composition began to foam within three minutes and thermoset within a short period of time of less than one hour to a cellular resinous body having a density of between 2.0 and 3.0 pounds per cubic foot.

The following examples are illustrative of other compositions produced in accordance with the invention:

Example V

| | |
|---|---|
| Phenol formaldehyde reaction product | 84.5 |
| Condensation product of ethylene oxide and dodecy phenol | 1.7 |
| Hydrogen peroxide (50%) | 9.8 |
| Ethanesulfonic acid | 4.1 |

The density of the thermoset cellular resin produced therefrom was three pounds per cubic foot.

Example VI

| | |
|---|---|
| Phenol formaldehyde reaction product | 79.3 |
| Condensation product of ethylene oxide and dodecyl phenol | 1.6 |
| Hydrogen peroxide (60%) | 10 |
| Metabenzene disulfonic acid (68%) | 9.1 |

The thermoset foam produced by the spontaneous reaction of this composition had a density of 1.25 pounds per cubic foot.

Example VII

| | |
|---|---|
| Phenol formaldehyde reaction product | 69.9 |
| Condensation product of ethylene oxide and octadecyl phenol | 1.4 |
| Hydrogen peroxide (50%) | 18.3 |
| Polyphosphoric acid | 10.4 |

The thermoset cellular body produced on the spontaneous foaming of the composition at a density of 1.9 pounds per cubic foot.

Example VIII

| | |
|---|---|
| Phenol formaldehyde partial reaction product | 73.0 |
| Octyl phenol polyethylene glycol ether | 2.0 |
| Hydrogen peroxide (50%) | 14.9 |
| Phenol sulfonic acid (68%) | 10.1 |

When admixed and permitted to expand, the composition of this example produced thermoset cellular bodies of an extremely fine and uniform texture and the body had a density of 1.2 pounds per cubic foot.

Example IX

Into a reaction vessel there was charged phenol and 40% aqueous formaldehyde in the proportions of 1 mole of phenol to 2½ moles of formaldehyde with 3%, based on the weight of the phenol, of sodium hydroxide. The contents of the vessel were heated for three hours at a temperature of between 75° C. and 80° C. The reaction product was vacuum dehydrated to eliminate part of the water leaving 17% of water in the reaction product, which had a viscosity of 50–55 poises at room temperature. This composition may be substituted for the compositions in Examples II to VIII with substantially a similar cellular resin resulting.

Example X

A phenol aldehyde resin was prepared by reacting the phenol, formaldehyde and sodium hydroxide mixture of Example I under reflux for 1½ hours at 97° C. After neutralizing to a pH of 6 with lactic acid, the reaction product was dehydrated to a vacuum of 29.8 inches of mercury for fifteen minutes to a viscosity of 36 poises. The water content was approximately 10% by weight. The partially reacted resin produced in accordance with this example can be substituted for any of the phenolic resins of Examples II to VIII with good thermoset cellular bodies being secured.

Example XI

A resin was prepared by reacting 1.25 moles of formaldehyde (40% aqueous solution) with one mole of cresylic acid and 1% ethylene diamine based on the weight of the cresylic acid added as a catalyst. The mixture was refluxed for twenty minutes, acidified with acetic acid to a pH of 6.5 and dehydrated under vacuum to a viscosity of 15 poises. The product contained 18% by weight of water. The phenol formaldehyde reaction product of this example may be substituted for all or a part of the phenol formaldehyde resins of Examples II to VIII.

Example XII

The following were reacted: phenol, 1 mole; acetaldehyde, 2 moles; sodium hydroxide, 1¼%. The mixture was heated for six hours over a temperature range of from 75° C. to 92° C. Thereafter, the mixture was acidified with acetic acid to a pH of 6.5 and then dehydrated under a vacuum of 27 inches of mercury at a maximum temperature of 118° C. The viscosity was approximately 2½ poises. The water content of the resinous product was 22%. This resinous reaction product can be substituted for the phenolic reaction products in Examples II to VII with almost equivalent cellular products resulting.

*Example XIII*

The following were admixed:

| | |
|---|---|
| Phenol formaldehyde resin of Example IX | 64.7 |
| Condensation product of ethylene oxide and octadecyl phenol | 1.3 |
| Hydrogen peroxide (50%) | 18.2 |

To this mixture there was added a mixture of acids comprising 13.1 parts of monoethyl orthophosphoric acid and 2.7 parts of phosphorous pentoxide. Upon adding the mixed acids, the composition began to expand in less than two minutes and thermoset in a fraction of an hour to a cellular resinous mass having a density of 4.3 pounds per cubic foot. This thermoset resin was substantially non-inflammable.

In order to provide for somewhat tougher cellular walls in the expanded resin, there may be included in the expansible composition in an amount of not over 8% of its weight of at least one thermoplastic resin selected from the group consisting of polyvinylals, polyvinyl esters, hydrolysis products of polyvinyl esters, cellulose esters, cellulose ethers, polyvinylidene chloride, polyacrylates, polymers of acrylic acid esters and polymers of alkyl acrylic acid esters. Typical examples of the above that have been employed with success are polyvinyl butyral, polyvinyl acetate, polyvinylidene chloride, cellulose acetate, ethyl cellulose, polyvinyl alcohol (for example, the 80% hydrolysis product of polyvinyl acetate), polymethacrylate, and polymethylmethacrylate.

Plasticity may be imparted to the phenol aldehyde resin by incorporating up to ½ mole of a polyhydric alcohol per mole of phenol. Suitable polyhydric alcohols are glycerol and aliphatic liquid glycols of up to eight carbon atoms, such for example as diethylene glycol.

To secure a predetermined texture or to strengthen the cellular thermoset composition, there may be added to the composition prior to its heat-treatment, an amount not exceeding 10% of the weight of the composition of finely divided inert solids. Finely divided silica flour, wood flour, walnut shell flour, asbestos fibers, silica gel, acetylene black, aluminum powder and mica are examples of suitable materials. Wood flour and finely divided cotton fibers in particular enable a tougher, stronger cellular product to be produced. For example, the composition of Example II may be successfully foamed with up to 5% of silica flour (325 mesh), silica gel, microfine asbestos fibers, and aluminum powder. The density of the cellular insulation will not be increased significantly over the cellular product without these solid additives.

The cellular compositions of the present invention are not only useful for thermal insulation applications but are useful for preparing buoyant members, such as for example boat hulls, floats and the like. Structural members having great strength for a given weight may be prepared by combining the expanded cellular compositions with surface sheets or shells composed of steel, aluminum, wood, cloth, glass fiber, fabrics and resin laminates. Thus air foils for aircraft possessing great rigidity and strength may be prepared by shaping sheets of aluminum or steel alloy into the desired external shape of the air foil and then filling the internal spaces of the air foil with the composition of the present invention and permitting it to expand to fill the entire space. The resins in expanding will adhere to the surfaces of the sheets forming the air foil thereby imparting rigidity thereto and preventing their buckling when loaded. The higher density cellular compositions of the present invention present great inherent strength and toughness.

The compositions of the present invention may be introduced into various molds lined with paper, cellophane or other thin resinous liners and after the composition has expanded and thermoset to fill the entire space, the shaped members may be removed from the molds. Such molded members may be employed for various purposes requiring extremely light shapes.

Since certain obvious changes may be made in the above procedure and different embodiments of the invention could be made without departing from the scope thereof, it is intended that all matter contained in the above description and drawing shall be taken in connection with the accompanying claims and not in a limiting sense.

I claim as my invention:

1. The method of preparing a thermoset cellular resinous body comprising admixing as essential reactive ingredients (a) between 50% and 90% by weight of a thermosetting partially reacted aqueous reaction product of one mole of at least one phenol selected from the group consisting of phenol, cresol, xylenol and cresylic acid and between 1 and 3 moles of at least one aldehyde selected from the group consisting of formaldehyde, reactive polymers of formaldehyde, acetaldehyde, hexamethylenetetramine, and furfuraldehyde, the reaction being carried out in the presence of from 0.05% to 5% based on the weight of the phenol, of an alkaline catalyst for the reaction, the reaction being carried out in the presence of substantial amounts of water and at a temperature of between 50° C. and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of at least one acid stable, water soluble, surface active agent selected from the group consisting of non-ionic alkyl polyethers wherein the alkyl groups contain from 8 to 18 carbon atoms, (c) a peroxide solution selected from the group consisting of an aqueous solution of hydrogen peroxide of a concentration of from 20% to 90% $H_2O_2$ and a solution containing from 40% to 80% of methyl ethyl ketone peroxide in an organic solvent, the peroxide solution being in an amount providing free oxygen equal to that available in from 1% to 20% by weight of 100% $H_2O_2$, and (d) approximately 49% to 2% by weight of at least one strong acid selected from the group consisting of hydrochloric acid, sulfuric acid, nitric acid, phosphoric acid, pyrophosphoric acid, polyphosphoric acid, water-soluble sulfonic acids, hydrobromic acid, hydriodic acid and trichloracetic acid, the acid comprising not over 80% by weight of water, and allowing the resulting mixture to expand to produce a thermoset cellular body.

2. The cellular, expanded thermoset resinous body produced by the process of claim 1 employing a phosphoric acid as the strong acid (d).

3. The method of preparing a thermoset cellular resinous body comprising admixing (a) between 50% and 90% by weight of a thermosetting partially reacted aqueous reaction product of one mole of at least one phenol selected from the group consisting of phenol, cresol, xylenol and cresylic acid and between 1 and 3 moles of at least one aldehyde selected from the group consisting of formaldehyde, reactive polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water at a temperature of between 50° and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of a surface active, organic agent selected from the group consising of non-ionic alkyl polyethers wherein the alkyl groups contain from 8 to 18 carbon atoms, (c) from 1% to 20% by weight of a solution of methyl ethyl ketone peroxide in an organic solvent, and (d) the balance, approximately 49% to 2% by weight, of a strong acid selected from the group consisting of hydrochloric acid, sulfuric acid, nitric acid, phosphoric acid, pyrophosphoric acid, polyphosphoric acid, water-soluble sulfonic acids, hydrobromic acid, hydriodic acid and trichloracetic acid, the acid comprising not over 80% by weight of water, and allowing the resulting mixture to expand to produce a thermoset cellular body.

4. The method of preparing a thermoset cellular resinous body comprising admixing (a) between 50% and 90% by weight of a thermosetting partially reacted aqueous reaction product of one mole of at least one phenol selected from the group consisting of phenol, cresol, xylenol and cresylic acid and between 1 and 3 moles of at least one aldehyde selected from the group consisting of formaldehyde, reactive polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water and at a temperature of between 50% C. and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of at least one acid stable, water soluble, surface active agent selected from the group consisting of non-ionic alkyl polyethers wherein the alkyl groups have from 8 to 18 carbon atoms, (c) an aqueous solution of hydrogen peroxide of a concentration of from 20% to 90% $H_2O_2$, the aqueous solution of hydrogen peroxide being in an amount providing free oxygen equal to that in from 1% to 20% by weight of 100% $H_2O_2$, and (d) the balance, approximately 49% to 2% by weight, of at least one strong acid selected from the group consisting of hydrochloric acid, sulfuric acid, nitric acid, phosphoric acid, pyrophosphoric acid, polyphosphoric acid, water-soluble sulfonic acids, hydrobromic acid, hydriodic acid and trichloracetic acid, the acid comprising not over 80% by weight of water, and allowing the resulting mixture to expand to produce a thermoset cellular body.

5. The method of preparing a thermoset cellular resinous body comprising admixing (a) between 50% and 90% by weight of a thermosetting partially reacted aqueous reaction product of one mole of at least one phenol selected from the group consisting of phenol, cresol, xylenol and cresylic acid and between 1 and 3 moles of at least one aldehyde selected from the group consisting of formaldehyde, reactive polymers of formaldehyde, acetaldehyde, hexamethylenetetramine, and furfuraldehyde, the reaction being carried out in the presence of from 0.05% to 5%, based on the weight of the phenol, of an alkaline catalyst for the reaction, the reaction being carried out in the presence of substantial amounts of water and at a temperature of between 50° C. and 115° C. for a time of between ½ hour and 20 hours, and dehydrating the reaction product while maintaining it at a pH of between 3 and about 11 to provide a resinous product containing between 3% and 25% water and having a viscosity of between 1 and 250 poises, (b) between 5% and 0.1% by weight of at least one acid stable, water soluble, surface active agent selected from the group consisting of non-ionic alkyl polyethers wherein the alkyl groups have from 8 to 18 carbon atoms, (c) a solution of a peroxide selected from the group consisting of 20% to 90% hydrogen peroxide and 40% to 80% of methyl ethyl ketone peroxide solution in an organic solvent, the peroxide solutions providing free oxygen equal to the amount available in from 1% to 20% by weight of 100% hydrogen peroxide, and (d) the balance, approximately 49% to 2% by weight, of at least one strong acid selected from the group consisting of hydrochloric acid, sulfuric acid, nitric acid, phosphoric acid, pyrophosphoric acid, polyphosphoric acid, water-soluble sulfonic acids, hydrobromic acid, hydriodic acid and trichloracetic acid, the acid comprising not over 80% by weight of water, and allowing the resulting mixture to expand to produce a thermoset cellular body.

6. The method of claim 5 wherein the (a) aqueous reaction product is treated with an acid prior to dehydration to reduce the pH to a value of from 3 to a value of below 11.

ROBERT F. STERLING.

References Cited in the file of this patent

UNITED STATES PATENTS

| Number | Name | Date |
|---|---|---|
| 2,140,062 | Talalay | Dec. 13, 1938 |
| 2,446,429 | Nelson | Aug. 3, 1948 |

FOREIGN PATENTS

| Number | Country | Date |
|---|---|---|
| 538,624 | Great Britain | Aug. 11, 1941 |
| 583,796 | Great Britain | Dec. 31, 1946 |
| 885,581 | France | May 31, 1943 |

OTHER REFERENCES

Chem. and Eng. News, June 16, 1947, page 1747.